United States Patent
Ritter, Jr. et al.

[11] 3,723,083
[45] Mar. 27, 1973

[54] TEXTURED CONVEYOR ROLL AND METHOD OF FINISHING THE SAME

[75] Inventors: George F. Ritter, Jr., Rossford; Roger P. King, Toledo, both of Ohio

[73] Assignee: Libby-Owens-Ford Company, Toledo, Ohio

[22] Filed: Dec. 23, 1970

[21] Appl. No.: 101,196

Related U.S. Application Data

[63] Continuation of Ser. No. 676,794, Oct. 20, 1967, abandoned.

[52] U.S. Cl. .................65/119, 65/114, 65/196, 65/374, 29/121 R, 29/148.4 D
[51] Int. Cl. ...............................C03b 25/04
[58] Field of Search........65/111, 117, 118, 119, 114, 65/196, 374; 29/148.4 D, 121 R

[56] References Cited
UNITED STATES PATENTS

| | | |
|---|---|---|
| 3,372,016 | 3/1968 | Rahrig et al. ...........................65/114 |
| 3,171,528 | 3/1965 | Andersen ...........................65/114 X |
| 2,114,072 | 4/1938 | Cleveland...................29/148.4 D X |
| 3,177,558 | 4/1965 | Gronholz et al. ...................29/121 R |

*Primary Examiner*—Arthur D. Kellogg
*Attorney*—Elmer L. Collins and Phillip S. Oberlin

[57] ABSTRACT

The conveyor roll disclosed is provided with a special textured surface finish and is of particular utility for support and conveying glass sheets during heating thereof from room temperature to a relatively high temperature, said textured surface finish reducing the area of contact between the roll and glass sheets, thereby lowering the rate of heat transfer and lessening the liability of breakage of the glass.

3 Claims, 4 Drawing Figures

TEXTURED CONVEYOR ROLL AND METHOD OF FINISHING THE SAME

This is a continuation of application Ser. No. 676,794, filed Oct. 20, 1967, now abandoned.

The present invention relates to improvements in conveyor rolls and more particularly to an improved roll for supporting and conveying sheets of glass through a furnace preparatory to further processing of said sheets, and to a method of surface finishing said roll.

In one known method flat sheets of glass are passed through a tunnel-type furnace wherein they are heated to a relatively high temperature before being removed therefrom into an area for further processing, such as bending and/or tempering. During travel of the sheets through the furnace they are supported upon a series of conveyor rolls mounted in spaced relation in a horizontal plane. The glass sheets are ordinarily at room temperature when introduced into the entrance end of the furnace, and are gradually heated to a temperature of around 1,130° to 1,180° F. as they pass therethrough to the exit end thereof.

The conveyor rolls usually employed are of stainless steel and are provided with smooth polished glass contacting surfaces. The rolls adjacent the entrance end of the furnace are ordinarily at a relatively high temperature, i.e., between 875° and 950° F., and as a consequence there is a relatively rapid heat transfer between the glass sheets and the rolls as said sheets enter the furnace. Due to this temperature differential the glass sheets are subjected to a thermal shock of relatively high magnitude, which is apt to cause breakage of the glass. This has been found to be particularly the case when the glass sheets have holes drilled in them. The thermal shock to which they are subjected has a tendency to break the sheets along a line extending through the holes. This phenomenon is referred to in the glass bending art as "hole poppers." The temperature of the rolls increases to a temperature of between 1,175° and 1,250° F. adjacent the exit end of the furnace.

It is therefore a primary object of this invention to provide an improved conveyor roll for supporting and conveying glass sheets through a furnace in which the liability of breakage of the sheets due to thermal shock upon engagement of said sheets with the rolls will be greatly reduced, if not eliminated.

Another object of the invention is to provide such a conveyor roll in which the area of surface contact thereof with the glass sheets is materially reduced, thereby lowering the rate of heat transfer therebetween.

Another object of the invention is to provide such a conveyor roll having a textured surface finish, and a novel method of treating a roll to obtain such finish.

Other objects and advantages of the invention will become more apparent from the following description when taken in connection with the accompanying drawings, in which.

Figure 4:
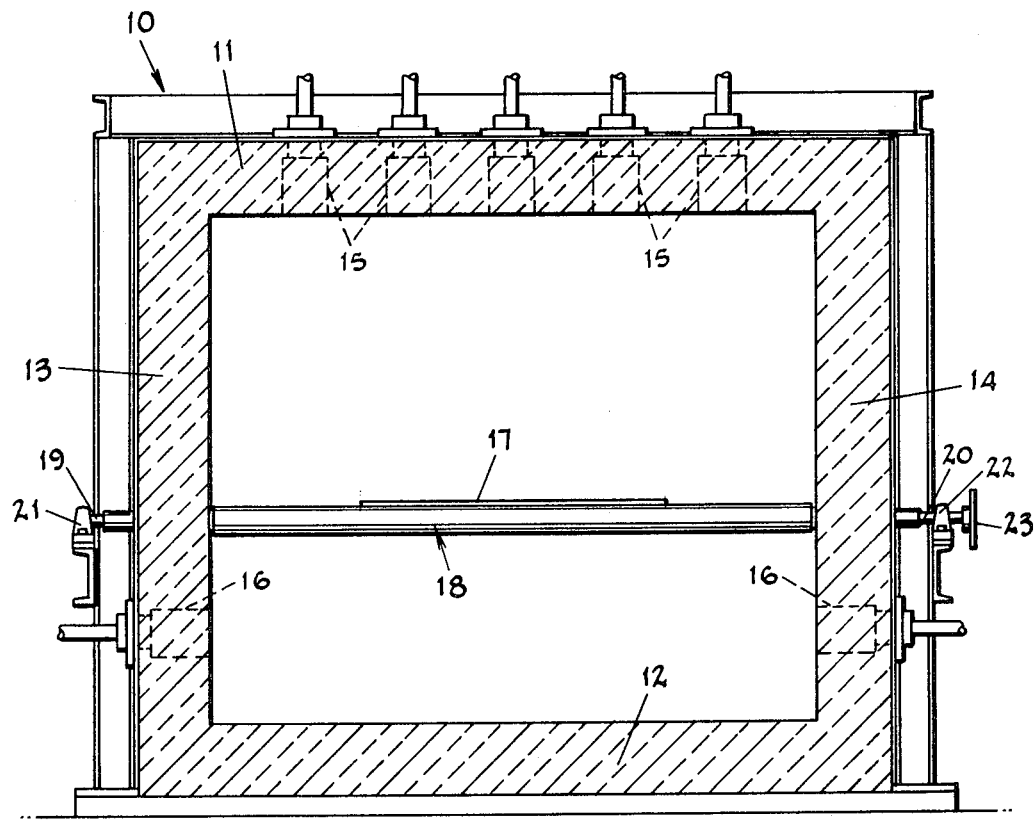
FIG. 4 is a transverse sectional view through a typical tunnel-type furnace in which conveyor rolls provided by the invention have been successfully used.

Referring now to the drawings, and particularly to FIG. 4, there is illustrated a tunnel-type furnace 10 in which conveyor rolls of the present invention may be used. The furnace 10 comprises top and bottom walls 11 and 12 and opposite side walls 13 and 14 formed of suitable refractory material.

The interior of the furnace is heated by radiant gas burners or other suitable heating means 15 mounted in the top wall 11, and also by burners 16 mounted in the side walls 13 and 14 adjacent the bottom wall 12. Glass sheets 17 are supported upon and conveyed through the furnace by a roller conveyor including a plurality of horizontally spaced rolls 18 (only one being shown). These rolls extend transversely of the furnace and project through openings in the side walls 13 and 14, the opposite end portions 19 and 20 of said rolls being journaled in bearings 21 and 22 respectively, suitably mounted at the sides of the furnace. The rolls may also be driven in any suitable manner such as by means of a chain and sprocket drive 23.

Heretofore, the conveyor rolls 18 were formed with smooth polished surfaces which provided a maximum area of contact between the rolls and the glass sheets 17. As a result, there was also maximum transfer of heat between the hot rolls and relatively cold glass when the sheets were introduced into the furnace. Since the rolls at the entrance end of the furnace are ordinarily at a relatively high temperature (i.e., in the neighborhood of 875° to 950° F.), while the glass sheets are at room temperature, the thermal shock to which the glass is subjected may well result in breakage thereof. As explained above, this has been found to be particularly true when the glass sheets have been previously drilled with holes, such as those used as side or door lights of automobiles.

The above disadvantages have been largely, if not entirely, overcome by the improved conveyor rolls of the present invention, the peripheral surfaces of which are provided with a special textured finish which effectively reduces the area of surface contact between the rolls and the glass and thereby reduces the rate of heat transfer from the rolls to the glass, greatly lessening the liability of breakage. It has been further found that with the rolls of this invention glass chips do not adhere to the textured surface; also that such rolls maintain their straightness and are less susceptible to warpage than rolls having smooth polished surfaces.

Figure 1:
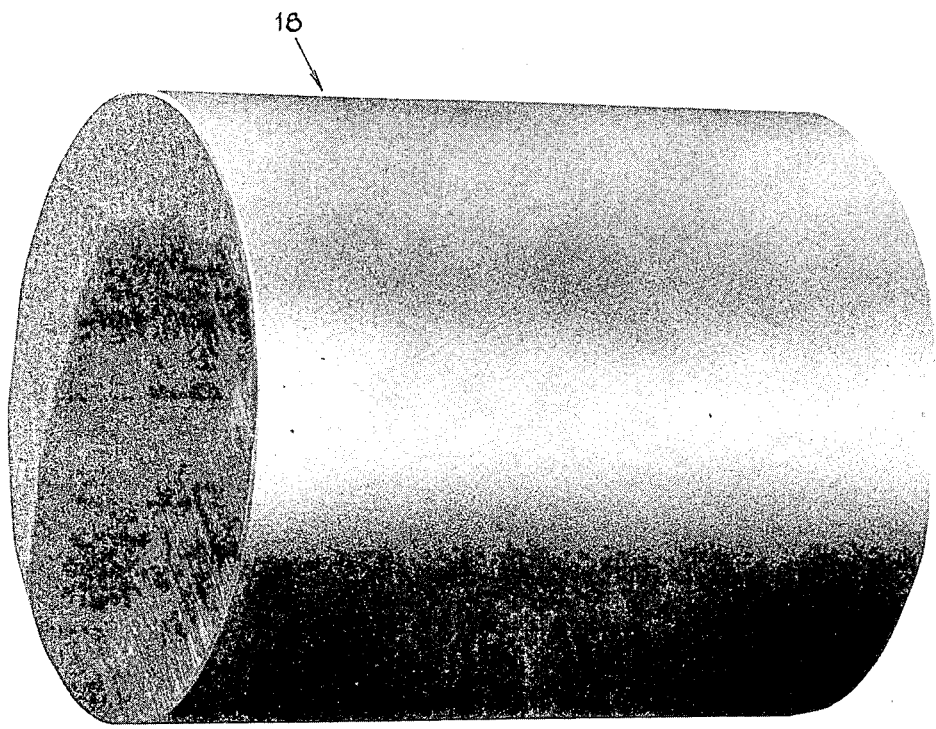
FIG. 1 is a photolithographic view of a portion of a textured conveyor roll having a surface finish according to the present invention.

According to the present invention, the rolls 18 are stainless steel rolls and are formed from solid bar stock as shown in FIG. 1. By way of example, one such rolls which has proven successful in commercial production is Type 310 stainless steel, stabilized with Columbium (310 Cb). The analysis of this roll is as follows:

| | |
|---|---|
| Chromium | 24.00 – 26.00% |
| Nickel | 19.00 – 22.00% |
| Carbon | 0.25% max. |
| Columbium | 10 times minimum Carbon |
| Manganese | 2.00% max. |
| Silicon | 1.50% max. |
| Sulfur | 0.030% max. |
| Phosphorous | 0.040% max. |
| Iron | Balance |

The peripheral or glass contacting surface of the roll 18 is first rough ground and then subjected by any suitable method to super-finishing or polishing to produce a finish of 10 micro-inches or less, as measured by a profilometer or other surface finish gauge.

After the required super-finish has been obtained on the roll surface, the surface is further treated to provide a textured finish having valleys and peaks, and in which the tops of the peaks are rounded off. This is accomplished by subjecting the roll surface to shot blasting with very fine glass beads. For example, glass beads having a sieve size of minus 40 to plus 70 have been found satisfactory. This sieve size equates to 0.0164 to 0.0082 of an inch or in microns from 420 microns to 210 microns. The beads are blasted against the roll surface by a hand held or machine mounted blast gun during spinning of the roll. To produce a clean uniform finish it is necessary to match the roll r.p.m. with the gun travel speed.

Figure 3:
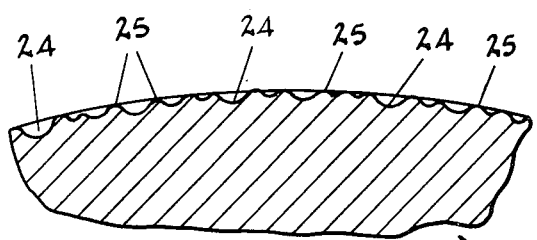
FIG. 3 is a cross-sectional view of a portion of the roll surface.

As shown in FIG. 3, the force of the glass beads, when projected against the roll surface, causes a compressing of the metal at the points of contact to form microscopic dents or valleys 24, and at the same time pushes or spreads the metal outwardly to form rims or peaks around the valleys, with the tops of the peaks rounded off as at 25. The blasting with the glass beads is continued until a uniform clean 80–120 micro-inch textured finish is produced on the roll, as measured by a profilometer or other surface finish gauge.

Figure 2:
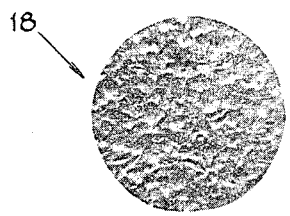
FIG. 2 is an enlarged photographic view of a portion of the peripheral surface of the roll.

A photolithographic view of a portion of a roll having a textured surface finish formed by the method of this invention is shown in FIG. 1, while in FIG. 2, is shown a magnified view of a portion of the roll surface of FIG. 1.

As previously pointed out, rolls having the textured surface finish of this invention have been found to be of particular utility for conveying glass sheets through a heating furnace during which the sheets are brought from room temperature to a relatively high temperature and in which the sheets are subsequently bent and/or tempered for use as window and door lights in automobiles. Not only has breakage of the glass sheets due to thermal shock by high heat transfer between the rolls and glass been materially reduced, if not eliminated but also marring of the sheet surfaces by the rolls or by glass chips adhering to the rolls has also been reduced with the result that the furnace output of an acceptable quality product has been definitely improved.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. In the conveying of glass sheets through a furnace upon spaced solid rolls of stainless steel during which the sheets are heated from room temperature to a relatively high temperature, the improvement comprising blasting a plurality of stainless steel rolls 93 glass beads of a size from about 0.0164 inch to about 0.0082 inch to form on said rolls an 80–120 micro inch textured finish having microscopic dents and rounded rims raised above the normal surface of the roll; providing a conveyor of such plurality of finished rolls in combination with said furnace; and placing said glass sheets upon said conveyor, thereby conveying said sheets through said furnace, whereby minimal contact of said sheets with said rolls resulting from the support of said sheets by said raised, rounded rims inhibits the development of excessive thermal shock in said glass sheets.

2. In a method of heating glass sheets from ambient temperature to a relatively high temperature while conveying said sheets to a station for subsequent processing, the improvement comprising the steps of conveying said sheets through a heating furnace on cylindrical metallic rolls of stainless steel, said rolls having a glass contacting surface with a uniform 80–120 micro inch textured finish including generally circular dents depressed below the original surface of said rolls and rims of metal surrounding said dents displaced outwardly and upwardly from said dents and extending above said original surface, the tops of said rims being rounded off, and applying heat to said sheets as they advance through said furnace until said sheets reach said relatively high temperature.

3. In apparatus for heating glass sheets from ambient temperature to a relatively high temperature, the improvement comprising, in combination, top and bottom walls and opposite side walls defining a tunnel-type furnace, heaters in at least some of said walls for heating said glass sheets within said furnace, a plurality of horizontally spaced cylindrical rolls extending transversely within said furnace upon which said glass sheets are conveyed through said furnace, and a glass contacting surface upon said rolls comprising a uniform 80–120 microinch textured finish including generally circular dents depressed below the original surface of said rolls and rims of metal surrounding said dents displaced outwardly and upwardly from said dents and extending above said original surface, the tops of said rims being rounded off, whereby minimal contact of said sheets with said rolls resulting from the support of said sheet by said tops of said rims inhibits development of excessive thermal shock in said glass sheets as said sheets are heated.

* * * * *